US008732763B2

(12) United States Patent  
Cheng et al.

(10) Patent No.: US 8,732,763 B2  
(45) Date of Patent: May 20, 2014

(54) NAVIGATION AND DISCOVERY OF VIDEO ON DEMAND CONTENT VIA TV SCHEDULE ON HANDHELD DEVICES

(75) Inventors: Albert Hao Cheng, Valencia, CA (US); Skarphedinn S. Hedinsson, Stevenson Ranch, CA (US); David Watson, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 173 days.

(21) Appl. No.: 12/925,774

(22) Filed: Oct. 29, 2010

(65) Prior Publication Data

US 2011/0247039 A1      Oct. 6, 2011

Related U.S. Application Data

(60) Provisional application No. 61/341,656, filed on Apr. 1, 2010.

(51) Int. Cl.  
*H04N 5/21*      (2006.01)

(52) U.S. Cl.  
USPC .............................................. 725/52; 725/59

(58) Field of Classification Search  
USPC .......................................... 725/37–61, 86–87  
See application file for complete search history.

(56) References Cited

U.S. PATENT DOCUMENTS

| | | | | |
|---|---|---|---|---|
| 2003/0110491 A1* | 6/2003 | Rodriguez et al. | ............... | 725/39 |
| 2003/0229898 A1* | 12/2003 | Babu et al. | ..................... | 725/87 |
| 2004/0117831 A1* | 6/2004 | Ellis et al. | ...................... | 725/53 |
| 2009/0037954 A1* | 2/2009 | Nagano | ........................... | 725/39 |
| 2009/0307719 A1* | 12/2009 | Clark et al. | ...................... | 725/32 |
| 2010/0115553 A1* | 5/2010 | Van Flandern et al. | ......... | 725/39 |
| 2011/0154402 A1* | 6/2011 | Sinha et al. | ..................... | 725/52 |

\* cited by examiner

*Primary Examiner* — Benjamin R Bruckart  
*Assistant Examiner* — Aklil Tesfaye  
(74) *Attorney, Agent, or Firm* — Farjami & Farjami LLP

(57) ABSTRACT

There is provided a system and method for a user interface for viewing video on demand (VOD) content organized by corresponding television broadcast schedules. There is provided a method comprising receiving a time period for navigation, retrieving VOD programming data and television broadcast schedule data, generating a plurality of program listings by matching the VOD programming data to the television broadcast schedule data within the time period, displaying the plurality of program listings on a display, and outputting, to the display, video corresponding to a first program listing selected from the plurality of program listings. Users are thereby enabled to quickly and optimally navigate to VOD content of interest using a familiar broadcast schedule format.

18 Claims, 4 Drawing Sheets

NAVIGATION AND DISCOVERY OF VIDEO ON DEMAND CONTENT VIA TV SCHEDULE ON HANDHELD DEVICES

RELATED APPLICATIONS

This application claims priority to U.S. Provisional Application No. 61/341,656, filed on Apr. 1, 2010, which is hereby incorporated by reference in its entirety.

BACKGROUND OF THE INVENTION

1. Field of the Invention

The present invention relates generally to user interfaces. More particularly, the present invention relates to user interfaces for media consumption.

2. Background Art

Conventionally, Video on Demand (VOD) content is searched or browsed by program name, genre, or date of recording. These search methods may provide a wide range of results, but may be difficult and/or time consuming to navigate due to the large number of results that may be provided. Users may be forced to drill down several hierarchical layers of navigation and menus to find a desired program episode. As a result, many users may refrain from using VOD services due to inconvenient navigation and discovery of VOD content.

At the same time, portable devices capable of media streaming such as tablet computers, mobile phones, and other handheld devices are continuing to grow in popularity, and demand for VOD on such devices is expected to grow in the future. To harness this nascent demand and to encourage future market growth, a new method of navigating and discovering VOD content that is user friendly and intuitive is needed.

Accordingly, there is a need to overcome the drawbacks and deficiencies in the art by providing a way to navigate and discover VOD content in a user friendly and intuitive manner.

SUMMARY OF THE INVENTION

There are provided systems and methods for a user interface for viewing VOD content organized by corresponding television broadcast schedules, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for user interfaces navigating video on demand content organized by corresponding television broadcast schedules. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1A:
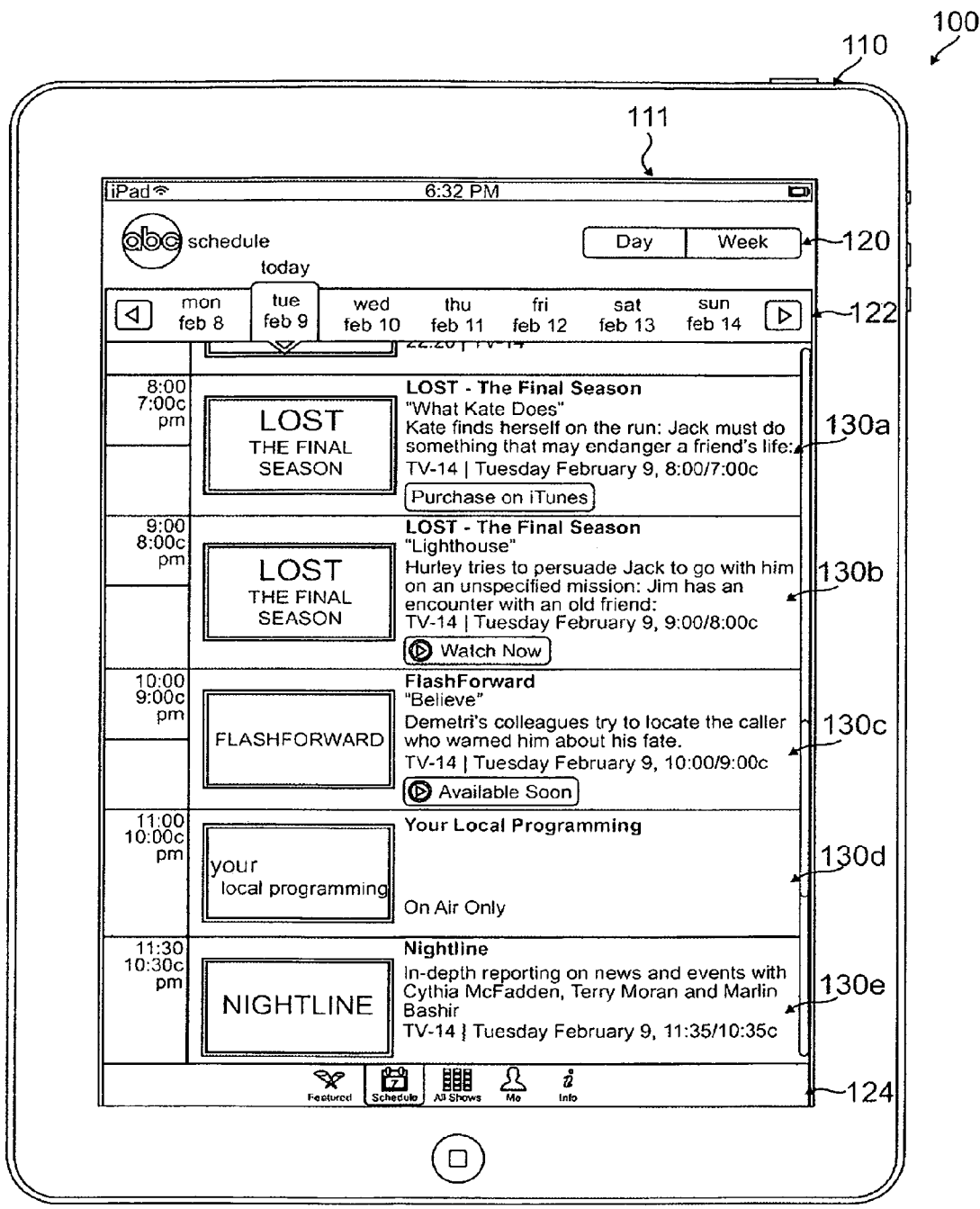
FIG. 1A presents a display of a portable device showing a user interface for navigating video on demand content organized by corresponding television broadcast schedules on a daily basis, according to one embodiment of the present invention.

FIG. 1A presents a display of a portable device showing a user interface for navigating video on demand content organized by corresponding television broadcast schedules on a daily basis, according to one embodiment of the present invention. Diagram 100 of FIG. 1A includes portable device 110. Portable device 110 includes display 111. A user interface is shown within display 111, including navigation bar 120, day selector 122, toolbar 124, and program listings 130a, 130b, 130c, 130d, and 130e.

Portable device 110 may comprise, for example, a touch based tablet computer having Internet access such as the iPad by Apple. However, portable device 110 may comprise any portable media device capable of streaming video content. As shown at the top of display 111 of FIG. 1A, the television broadcast schedule is organized around a single day since the "Day" tab is selected in navigation bar 120. This navigation tab may provide a detailed listing of a single day of programming. The data to populate the broadcast schedule may be retrieved from a database accessible from the Internet. While the schedule shown in FIG. 1A focuses on a single network, or the ABC network, alternative embodiments may allow a selection of a desired network or a composite view of several networks concurrently. Day selector 122 allows the user to select a particular day of scheduling. In the example depicted in FIG. 1A, the present day, or February 9, is selected for browsing.

The central user interface navigation window thus shows program listings 130a through 130e sorted by airing time for February 9, with links to associated VOD content if available. The VOD content may, for example, be provided using a distributed content delivery network or an online digital media store such as the iTunes Store. The navigation window may be vertically scrolled using, for example, multi-touch gestures and swipes or the scroll bar to the right side.

Besides providing links to VOD content, several additional modes of interaction may be offered. For example, sharing and social networking features may be provided, allowing users to share VOD program recommendations and watch lists. Users may therefore be notified if any friends are watching a particular VOD program and invited to also watch or purchase the same VOD program. The application may also retrieve data from or provide status updates to external sites, such as a linked Facebook or Twitter account. Notifications may also be supported to alert users when VOD content of interest is available for free streaming or is about to expire.

In program listing 130a, the episode of LOST titled "What Kate Does" airing at 8:00 pm has a link to purchase the associated VOD content from the iTunes store. Since this particular episode may comprise a repeat or rerun of an earlier aired episode, it may be past its free viewing window, as indicated by the message "Free Viewing Expired". On the other hand, moving below to program listing 130b, the episode of LOST titled "Lighthouse" airing at 9:00 may, for example, comprise a new or recently aired episode, and therefore a free viewing window may be provided for viewers to stream and watch the associated VOD content for a limited time, such as one week after airing. Thus, a "Watch Now" VOD link is provided for the "Lighthouse" episode, which may for example allow free Internet on-demand streaming with a download purchasing option.

In program listing 130c, the VOD link for the episode of FlashForward titled "Believe" is shown as disabled with an "Available Soon" message. This episode may, for example, comprise a brand new episode that has not yet been publicly aired, and therefore VOD access may be restricted until the episode begins or finishes an associated public airing. Moving to program listing 130d, as shown by the message "On Air Only" for the time slot reserved for local programming, only select programming may have associated VOD content available. For example, licensing restrictions for certain programs may only provide for on-air broadcasting and not VOD streaming. Thus, for example, the "Nightline" program shown in program listing 130e may be only viewable on air and unavailable for VOD streaming or purchase. Additionally, by detecting the location of portable device 110, for example by IP address geo-location or GPS data, regional restrictions may be enforced for VOD content.

Toolbar 124 is visible at the bottom of display 111, with the iconic selections "Featured", "Schedule", "All Shows", "Me", and "Info". The "Featured" selection may, for example, showcase new, popular, and recommended or featured VOD content. The "Schedule" selection shows the interface presently shown in display 111, where a television broadcast schedule is presented with links to VOD content if available. The "All Shows" selection may organize VOD content in a conventional format, allowing browsing by alphabetical program names, recording dates, day periods such as primetime, genres, or other sorting criteria. The "Info" selection may show general information regarding the navigation application, such as version information and copyright information.

The "Me" selection may provide personalization, customization, and other features related to user interactions with the application. The data shown in the "Me" selection may also be aggregated across multiple different devices and destinations. For example, if a user visits the abc.com VOD website and also owns an iPhone and an iPad each having an abc.com VOD player application, interactions across all three platforms may be aggregated into a single user account for convenient viewing from any platform.

For example, the "Me" selection may provide a viewing history showing all VOD content accessed from all platforms including abc.com, the iPhone, and the iPad. Seek bookmarks may also be provided for each video in the viewing history, allowing users to instantly resume where they may have left off. Additionally, the additional modes of interaction discussed above may be aggregated and managed in the "Me" selection. Thus, for example, users may be able to view all recommendations and watched VOD content from friends and contacts on social networks, set and manage notification alerts for the availability and expiration of programs of interest, and send status updates or messages through social networking protocols.

Figure 1B:
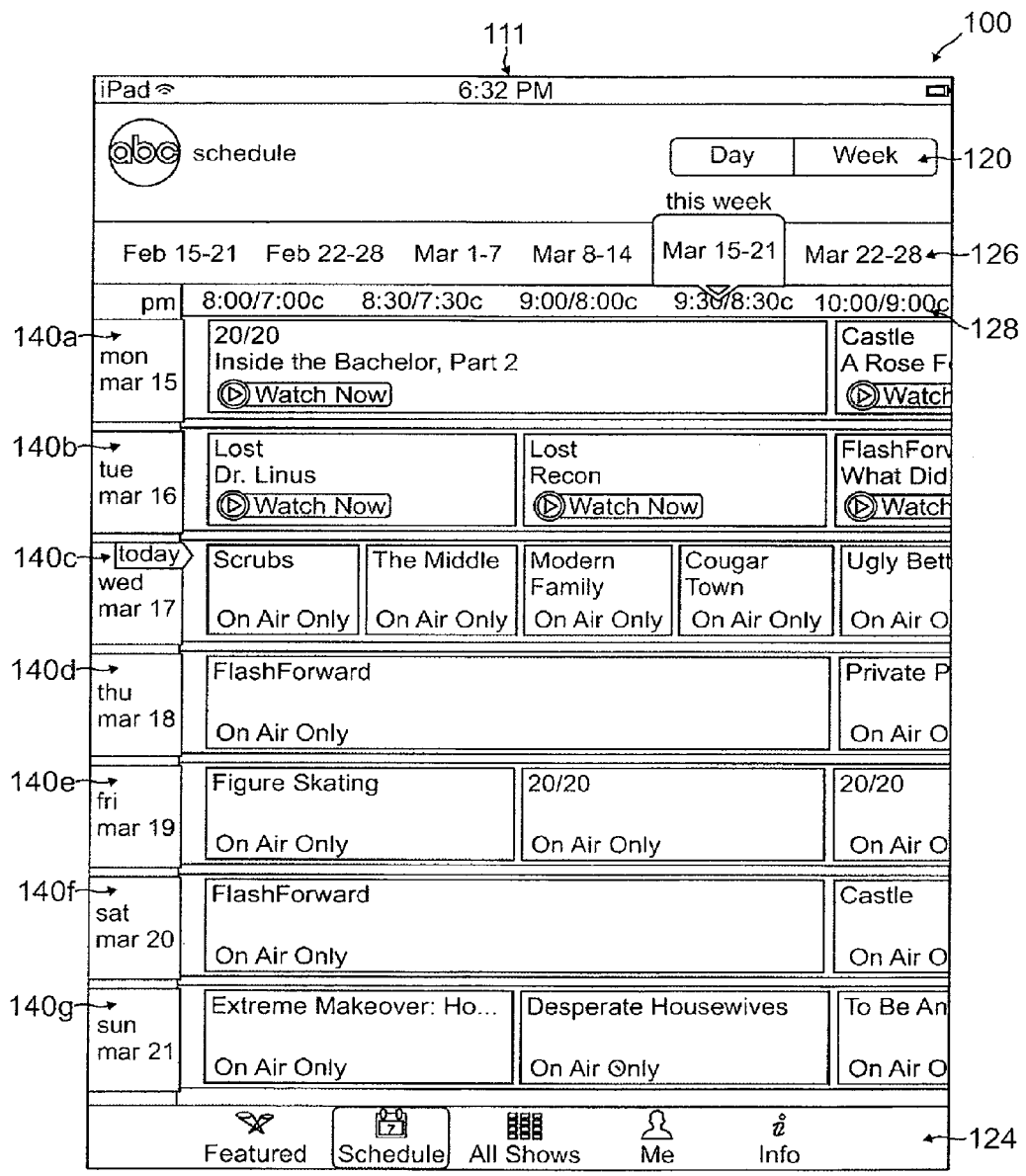
FIG. 1B presents a display of a portable device showing a user interface for navigating video on demand content organized by corresponding television broadcast schedules on a weekly basis, according to one embodiment of the present invention.

Moving to FIG. 1B, FIG. 1B presents a display of a portable device showing a user interface for navigating video on demand content organized by corresponding television broadcast schedules on a weekly basis, according to one embodiment of the present invention. Diagram 100 of FIG. 1B includes display 111. A user interface is shown within display 111, including navigation bar 120, toolbar 124, week selector 126, time indicator 128, and daily listings 140a, 140b, 140c, 140d, 140e, 140f and 140g.

As shown by toolbar 124, the "Week" tab is now selected, providing a detailed listing of a single week of programming. Week selector 126 allows the user to organize the television broadcast schedule based on a specific week of programming. In the example depicted in FIG. 1B, the present week, or March 15 through 21, is selected for browsing. The schedule shown in display 111 of FIG. 1B is shown in a condensed weekly format to fit a week of programming, or daily listings 140a through 140g, into a single interface window. This condensed view may be especially handy for users who want a brief overview of a few weeks of programming, which may be useful, for example, if a user returns from a two week long vacation. Rather than scrolling vertically as in the interface shown in display 111 of FIG. 1A, the interface shown in display 111 of FIG. 1B may scroll horizontally using multi-touch gestures or swiping motions, for example. Time indicator 128 may then indicate different time slots as the interface is scrolled horizontally. Similar to display 111 of FIG. 1A, programming slots may include VOD links if available, with some programs lacking VOD links due to airtime broadcasting restrictions, limited free viewing windows, licensing restrictions, or other circumstances.

Figure 2:
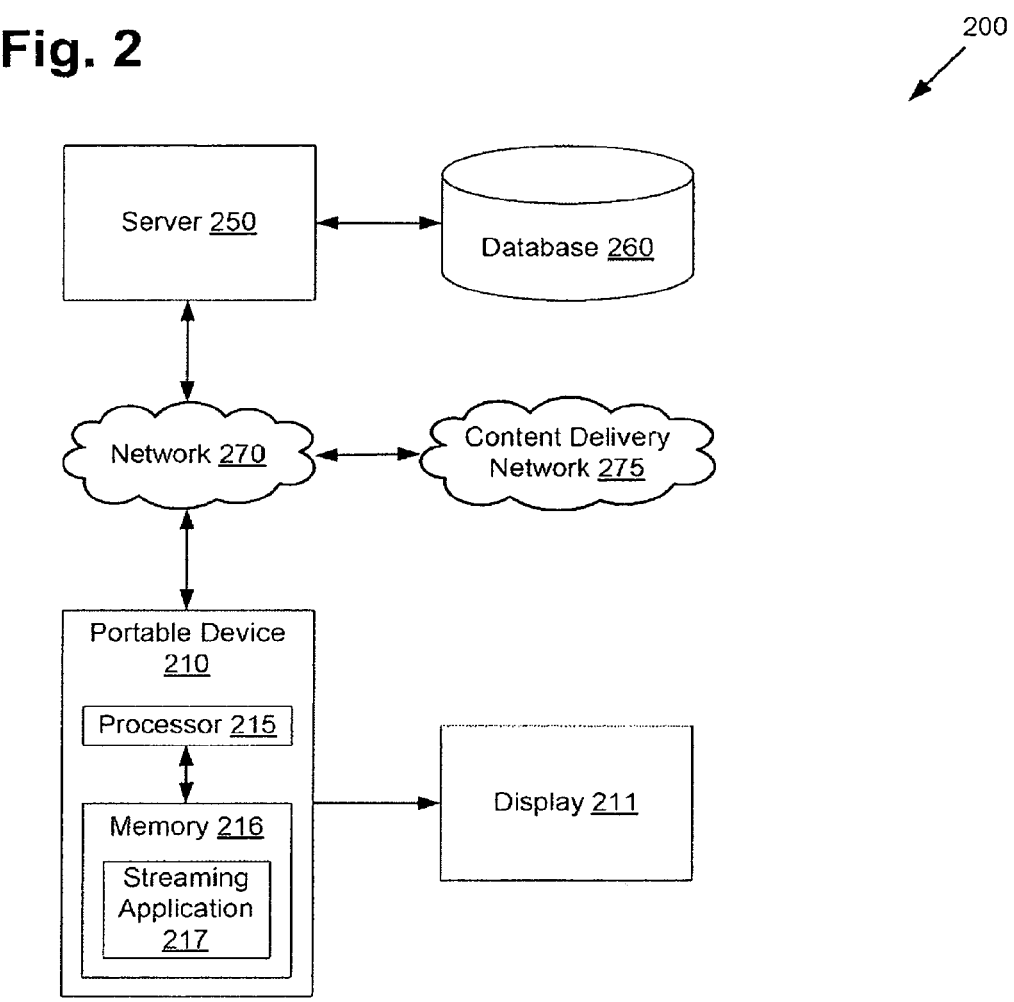
FIG. 2 shows a diagram of a system providing a user interface for navigating video on demand content organized by corresponding television broadcast schedules, according to one embodiment of the present invention.

Moving to FIG. 2, FIG. 2 shows a diagram of a system providing a user interface for navigating video on demand content organized by corresponding television broadcast schedules, according to one embodiment of the present invention. Diagram 200 of FIG. 2 includes portable device 210, display 211, server 250, database 260, network 270, and content delivery network 275. Portable device 210 includes processor 215. With respect to FIG. 2, portable device 210 may correspond to portable device 110 from FIG. 1A, and display 211 may correspond to display 111 from FIGS. 1A and 1B.

Portable device 210 may, for example, use a Wi-Fi or mobile broadband connection to connect to network 270. Server 250 may then provide streaming application 217 to portable device 210 via network 270, if necessary. Processor 215 may then execute streaming application 217 within memory 216, which may then retrieve video on demand programming data and corresponding television broadcast schedules from database 260 through server 250. The program listings may then be sorted and arranged based on corresponding television broadcast schedules by streaming application 217 for display on a user interface visible on display 211. After the user of portable device 210 selects a desired video program, portable device 210 may stream or download the selected video content from content delivery network 275, as appropriate.

Figure 3:
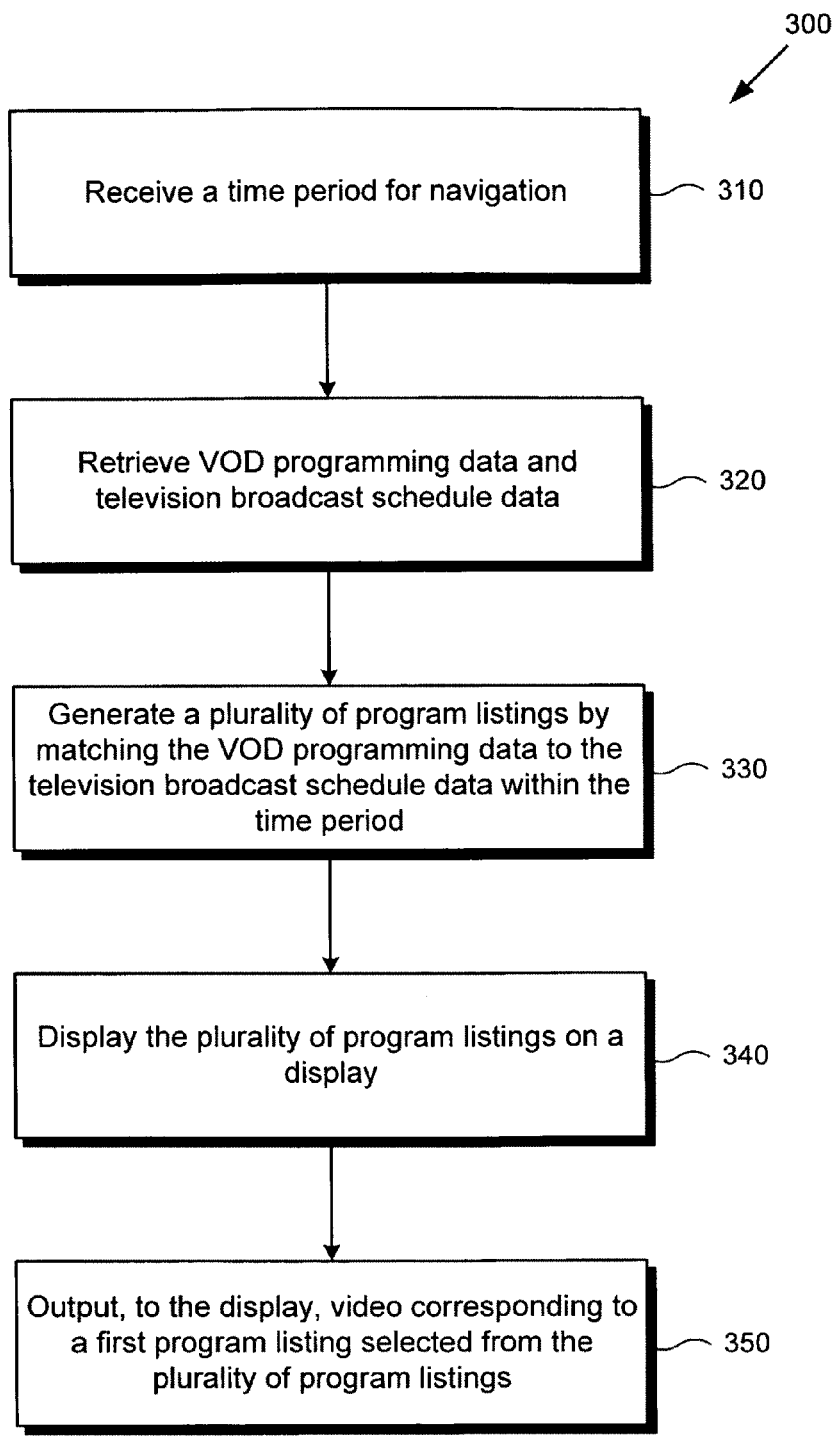
FIG. 3 shows a flowchart describing the steps, according to one embodiment of the present invention, by which a user interface for navigating video on demand content organized by corresponding television broadcast schedules may be provided.

Moving to FIG. 3, FIG. 3 shows a flowchart describing the steps, according to one embodiment of the present invention, by which a user interface for navigating video on demand content organized by corresponding television broadcast schedules may be provided. Certain details and features have been left out of flowchart 300 that are apparent to a person of ordinary skill in the art. For example, a step may comprise one or more substeps or may involve specialized equipment or materials, as known in the art. While steps 310 through 350 indicated in flowchart 300 are sufficient to describe one embodiment of the present invention, other embodiments of the invention may utilize steps different from those shown in flowchart 300.

Referring to step 310 of flowchart 300 in FIG. 3 and diagram 200 of FIG. 2, step 310 of flowchart 300 comprises processor 215 of portable device 210 receiving a time period for navigation. For example, display 211 may comprise a touch screen display, and the user may select a specific time period using display 211, as shown by day selector 122 in display 111 of FIG. 1A and week selector 126 in display 111 of FIG. 1B. Thus, the time period may span a single day, a single week, or another convenient span of time. Moreover, as shown in FIGS. 1A and 1B, the present time may be used to select a default time period, for example the present day or week. For example, the present time and date may be retrieved from a real-time clock within portable device 210, or retrieved from a network time synchronization provided by server 250.

Referring to step 320 of flowchart 300 in FIG. 3 and diagram 200 of FIG. 2, step 320 of flowchart 300 comprises processor 215 of portable device 210 retrieving VOD programming data and television broadcast schedule data. For example, the VOD programming data and television broadcast schedule data may be stored in database 260 and provided in response to a request from portable device 210 to server 250 over network 270. The request may be limited to the range specified by the time period received in step 310. In alternative embodiments, the VOD programming data and the television broadcast schedule data may be stored in different databases or provided by different servers. The VOD programming data may contain all the necessary data for streaming application 217 to locate and stream VOD content from content delivery network 275, such as media file references, access permissions, program and broadcast network identifiers, digital rights management (DRM) resources, and other data. The television broadcast schedule data may contain the schedules for broadcast programming at the local, affiliate, and national levels, for a single broadcasting network or for many different broadcast networks, as required by streaming application 217.

Referring to step 330 of flowchart 300 in FIG. 3 and diagram 200 of FIG. 2, step 330 of flowchart 300 comprises processor 215 of portable device 210 generating a plurality of program listings by matching the VOD programming data from step 320 to the television broadcast schedule data from step 320 within the time period from step 310. For example, if streaming application 217 is configured to present VOD viewing options for a particular broadcast network, then the television broadcast schedule data may be filtered to include only the program listings presented on air by the particular broadcast network, limited to the time period previously specified in step 320. The program listings may, for example, include thumbnails, summaries, reviews, ratings, and other metadata. Then, by for example matching unique identifiers of the program listings to the VOD programming data, program listings with available VOD viewing options may be updated accordingly, for example by including links to stream, download, purchase or rent a video of the associated program listing.

Referring to step 340 of flowchart 300 in FIG. 3 and diagram 200 of FIG. 2, step 340 of flowchart 300 comprises processor 215 of portable device 210 displaying the plurality of program listings from step 330 on display 211. If the time period received in step 310 spans a day, display 211 may appear similar to display 111 in FIG. 1A. Likewise, if the time period received in step 310 spans a week, display 211 may appear similar to display 111 in FIG. 1B. As shown in FIGS. 1A and 1B, program listings may include VOD links added from step 330, allowing users to watch, purchase, or anticipate the streaming or downloading of specific program listings.

Referring to step 350 of flowchart 300 in FIG. 3 and diagram 200 of FIG. 2, step 350 of flowchart 300 comprises processor 215 of portable device 210 outputting, to display 211, a video corresponding to a first program listing selected from the plurality of program listings displayed in step 340. For example, referring to FIG. 1A, the user may touch the "Watch Now" button presented in program listing 130b. Streaming application 217 may then determine the media reference associated with program listing 130b, which may then be requested from content delivery network 275 for streaming over network 270. Processor 215 may then decode and output the stream as the video on display 211.

The disclosed interfaces thereby enable users to quickly navigate to VOD content of interest using a familiar broadcast schedule format. As research indicates that a vast majority of users watch VOD content within 3 days of its associated broadcasting date, the disclosed interfaces provide an optimal way for users to find desired VOD content. Thus, for example, users can quickly find what they missed the last few nights during prime time, and can view any associated VOD content to catch up on their favorite programming aired during that time. As the popularity of portable devices having Internet access for streaming VOD content grows, it is of increasing importance to provide a convenient, user-friendly interface to access such VOD content and to provide value-added features such as social networking integration. Since the selection of VOD content presented to the user is more relevant to user viewing habits and interests, VOD services may enjoy increased user adoption rates as users become more comfortable supplementing their usual television watching habits with VOD content.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A device providing a user interface for navigating video on demand (VOD) content organized by corresponding television broadcast schedules, the device comprising:
   a processor configured to:
      receive a time period for navigation;
      retrieve VOD programming data for one television broadcast network available during the time period and television broadcast schedule data for the one television broadcast network available during the time period;
      generate a plurality of program listings including both the VOD programming data for the one television broadcast network available during the time period and the television broadcast schedule data for the one television broadcast network available during the time period;

display, for the time period, the plurality of program listings including both the VOD programming data and the television broadcast schedule data that are available for each of the plurality of program listings, on a display; and output, to the display, video corresponding to a first program listing selected from the plurality of program listings.

2. The device of claim 1, wherein the time period is based on a present time and date.

3. The device of claim 1, wherein the time period spans a day.

4. The device of claim 1, wherein the time period spans a week.

5. The device of claim 1, wherein the processor is configured to generate by including in the first program listing a link to stream the video.

6. The device of claim 1, wherein the processor is configured to generate by including in the first program listing a link to download the video.

7. The device of claim 1, wherein the processor is configured to generate by including in the first program listing a link based on a present time and date falling within a free viewing window.

8. The device of claim 1, wherein the processor is configured to retrieve the VOD programming data and the television broadcast schedule data over a network.

9. The device of claim 1, wherein the device comprises a portable device.

10. A method for a device to provide a user interface for navigating video on demand (VOD) content organized by corresponding television broadcast schedules, the method comprising:

receiving a time period for navigation;

retrieving VOD programming data for one television broadcast network available during the time period and television broadcast schedule data for the one television broadcast network available during the time period;

generating a plurality of program listings including both the VOD programming data for the one television broadcast network available during the time period and the television broadcast schedule data for the one television broadcast network available during the time period;

displaying, for the time period, the plurality of program listings including both the VOD programming data and the television broadcast schedule data that are available for each of the plurality of program listings, on a display; and outputting, to the display, video corresponding to a first program listing selected from the plurality of program listings.

11. The method of claim 10, wherein the time period is based on a present time and date.

12. The method of claim 10, wherein the time period spans a day.

13. The method of claim 10, wherein the time period spans a week.

14. The method of claim 10, wherein the generating includes in the first program listing a link to stream the video.

15. The method of claim 10, wherein the generating includes in the first program listing a link to download the video.

16. The method of claim 10, wherein the generating includes in the first program listing a link based on a present time and date falling within a free viewing window.

17. The method of claim 10, wherein the retrieving of the VOD programming data and the television broadcast schedule data is over a network.

18. The method of claim 10, wherein the device comprises a portable device.

* * * * *